H. H. TRENOR.
RUNNING GEAR FOR RAILROAD CARS.
No. 50,518. Patented Oct. 17, 1865.
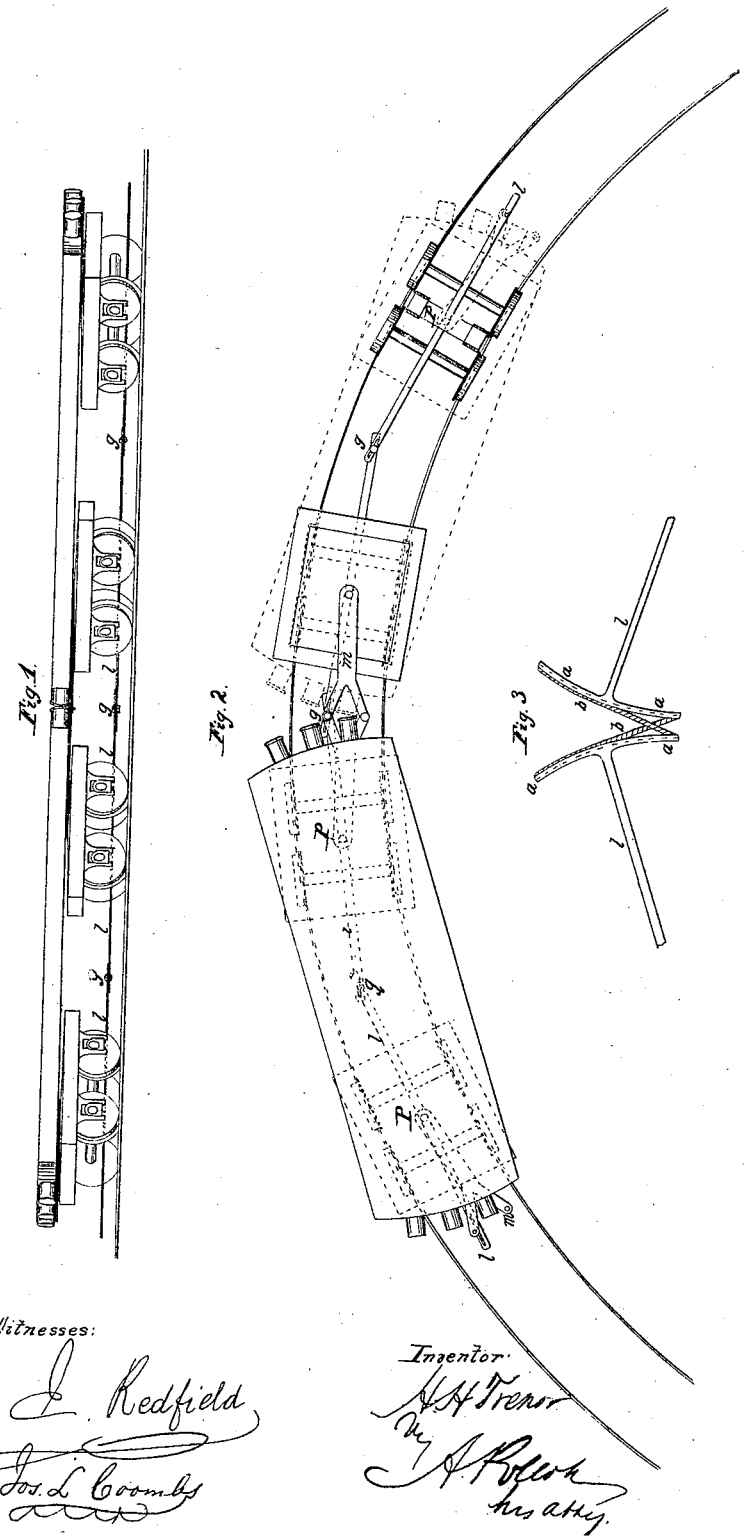

UNITED STATES PATENT OFFICE.

HENRY H. TRENOR, OF NEW YORK, N. Y.

IMPROVEMENT IN RUNNING-GEAR FOR RAILROAD-CARS.

Specification forming part of Letters Patent No. 50,518, dated October 17, 1865.

*To all whom it may concern:*

Be it known that I, HENRY H. TRENOR, of New York, in the county and State of New York, have invented certain new and useful Improvements in the Running-Gear for Railroad-Cars and other Vehicles; and I hereby declare that the following is a full, clear, and exact description of the same, reference being had to the accompanying drawings.

The danger and difficulty attending the running of railroad-cars on railroads, or of a series of vehicles on common roads, whether propelled by traction-engine or otherwise, consists in the curves or sinuosities of the roads. On railroads the cars are deviated from the straight line by friction of the wheels on the sides of the rails, which is directly proportionate to the pressure and speed, and inversely to the radius of the curve, so that to adapt the wheels to the curve of the rail much power is absorbed, while the strain on the rails and the liability of running off the track is proportionately increased.

To obviate this is the object of my invention; and it consists in a method of adapting all the axles or trucks of the train of cars or vehicles to the curves or direction taken by the leading axle or truck. This I have accomplished by combining with axles or trucks of vehicles, of whatever description, when pivoted so as to have a center of motion, a system of connection or coupling, whereby the movement of the one is necessarily transmitted to the others. This principle may be carried out in many different ways.

In the accompanying drawings I have shown one mode, which, as to simplicity and efficiency, answers the purpose well.

In the said drawings, Figure 1 represents an elevation of a train composed of two four-wheel-truck cars (the body of the car or vehicle being omitted) placed on a curve of a railroad. Fig. 2 is a plan view of the same. In the latter figure the platform of the forward car is removed, exhibiting the front truck with the truck-frame removed.

Each truck is pivoted on a center-pin, P, to the vehicle, so as to allow of its swinging on its center of attachment upon the platform. To each truck is rigidly secured at right angles to the axles, to extend both ways—*i. e.*, to the front and to the rear—a connecting-link, *l*, which will move with the body of the truck. The connecting-link of each truck is of a length so as to allow of its being connected with the link of the next preceding and succeeding truck.

The method of forming connection between the various links may be varied, according to circumstances or convenience. I have shown two modes. The one shown in Figs. 1 and 2 consists in slotting the ends of the links made to overlap each other, and passing through the slots a double-headed pin, *q*. The other (shown in plan view in Fig. 3) consists in providing the ends of the links, made for this purpose a little shorter, with arcs *a*, united by two cords or chains, *b*, each of which is fixed to opposite ends of the respective arcs. The object of these connections is to make them yielding—that is, while the ends of the links necessarily are moved to and from each other in the oscillatory movement imparted to them by the truck, they will be unyielding, or nearly so, in the lateral sense, with respect to each other. In addition to this mode of connecting the trucks by a directing link or links, I use a system of coupling of the cars, not by the platform, as heretofore practiced, but by the trucks, whereby liability of the body of the vehicle or car being thrown off the trucks is obviated.

In the Figs. 1 and 2 I have shown the cars to be connected by means of a coupling-link, *m*, attached to the pivot of the truck. The form of the link may be modified, according to the judgment of the engineer.

This invention is applied to railroad-cars as well as to other vehicles—for instance, to emigration-trains moved by traction-engines or otherwise. Many modifications may be applied without departure from my invention.

Having thus described my invention and the manner in which the same is or may be carried into effect, I shall state my claims, as follows:

1. In combination with the movable trucks of railroad-cars of otherwise ordinary or suitable construction, the directing connecting-ing-links, substantially as and for the purpose herein set forth.

2. The method of coupling the cars or vehicles of a train of two or more cars or vehicles by means of connecting-links attached to the pivots or king-bolts of the trucks, substantially as herein shown and set forth.

In testimony whereof I have signed my name to this specification before two subscribing witnesses.

HENRY H. TRENOR.

Witnesses:
  JOS. L. COOMBS,
  A. POLLOK.